R. J. Steele, Jr.
Sap Spout.
No. 87,219.  Patented Feb. 23, 1869.
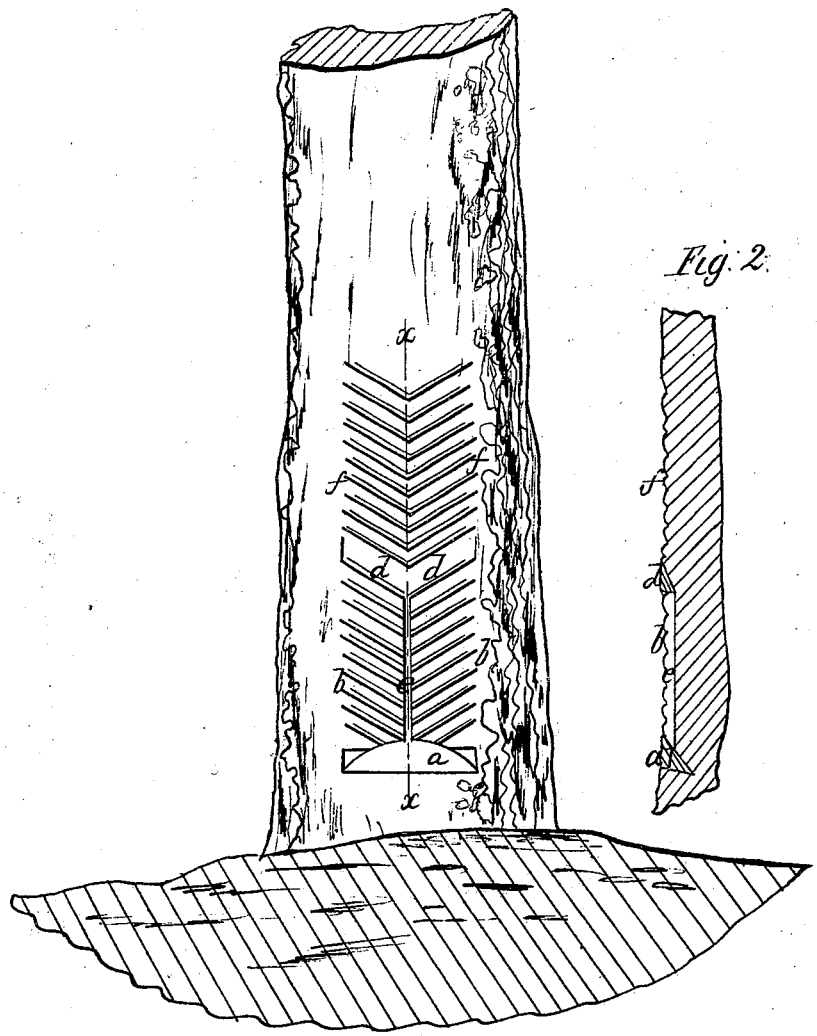

ROBERT J. STEELE, JR., OF ROCKINGHAM, NORTH CAROLINA.

Letters Patent No. 87,219, dated February 23, 1869.

IMPROVEMENT IN OBTAINING TURPENTINE FROM TREES.

The Schedule referred to in these Letters Patent and making part of the same.

*To all whom it may concern:*

Be it known that I, ROBERT J. STEELE, Jr., of Rockingham, in the county of Richmond, and State of North Carolina, have invented new and useful Improvements in Obtaining Turpentine from Trees; and I do hereby declare that the following is a full, clear, and exact description thereof, which will enable others skilled in the art to make and use the same, reference being had to the accompanying drawings, forming part of this specification.

Figure 1 represents a front view of my invention.

Figure 2 is a sectional view of the same, through the line $x\,x$, fig. 1.

Similar letters of reference indicate corresponding parts.

This invention relates to the obtaining of turpentine from pine-trees, whereby the product of the second and succeeding "workings," so called, of the trees, is of the same superior quality as that obtained by the first season's "working."

The invention also affords the means of working or obtaining turpentine from trees charred by fire, which were not, until my invention, available as turpentine-trees, but were neglected, or cut down for obtaining tar.

It has been the practice hitherto to obtain turpentine by first cutting a deep cavity, called a "box," in the tree, near the roots of the same. This box is shown at $a$. Above the box were cut a pair of grooves, $b\,b$, inclined downward, the meeting ends of the grooves being in a line above the box, as shown. A pair of grooves was cut each week, and as the season advanced, the number of such pairs of grooves would indicate the number of weeks the tree had been worked. The turpentine exuding from these grooves of the first season, ran down into the box $a$, and was dipped out. This turpentine is generally known as "virgin-dip," and is worth in the market from twenty-five to thirty-five per cent. more than that obtained in the succeeding seasons, for the product of the succeeding grooves had to trickle down over the old grooves of the previous season, and being thus exposed for a longer time to the sun and atmosphere, was more viscid, and of yellow color, and is known as "yellow-dip," an inferior article in the market.

My invention consists in cutting a shallow box, $d$, just above the last pair of the first season's grooves, and connecting it with the box $a$ by a vertical channel, $e$, and passing through the junction of the two grooves of each pair $b$, as shown.

The second season's grooves $f$ are now cut, from week to week, in the usual manner, and the turpentine runs down to the shallow box $d$, and thence, by the vertical channel $e$, to the first box $a$, thus avoiding the slow passage over the grooves of the previous season, for the deterioration of the second season's product has heretofore been due to its being thus retarded, and exposed for a longer time to the sun's rays and the atmosphere.

The shallow box $d$ consists substantially of two inclined channels, somewhat deeper than ordinary grooves, and having their lower ends communicating with the channel $e$. The product of the second season, when thus obtained, is as clear and pellucid as "virgin-dip," and the same in quality.

The grooves of the third season are cut as before, and a central vertical channel, as $e$, made through the grooves $f$, of the second year, to the box $d\,d$.

The turpentine passes down in this channel through the box $d\,d$, and thence down to the deep box $a$.

It will be observed, then, that as the seasons advance, the arrangement of the grooves and boxes, as shown, will be maintained as long as the tree is "worked," and "virgin-dip" being obtained each season.

This arrangement also permits the utilization of charred trees, which have hitherto been considered as valueless for obtaining turpentine, as the product would not flow over a charred surface, but became inspissated during its tardy passage over the same.

Having thus described my invention,

I claim as new, and desire to secure by Letters Patent—

The method, herein described, of working turpentine-trees by means of the channels $e$ and boxes $d$, in combination with the grooves $b\,f$ and base-box $a$, arranged as described, for the purpose specified.

ROBERT J. STEELE, JR.

Witnesses:
WILLIAM R. TERRY,
L. C. MORTON.